United States Patent
Lee et al.

(10) Patent No.: US 11,060,790 B2
(45) Date of Patent: Jul. 13, 2021

(54) REFRIGERATOR AND CONTROL METHOD THEREFOR

(71) Applicant: LG Electronics Inc., Seoul (KR)

(72) Inventors: Namgyo Lee, Seoul (KR); Jindong Kim, Seoul (KR); Yonghyeon Cho, Seoul (KR); Sunghee Kang, Seoul (KR); Jihyun Im, Seoul (KR)

(73) Assignee: LG Electronics Inc., Seoul (KR)

( * ) Notice: Subject to any disclaimer, the term of this patent is extended or adjusted under 35 U.S.C. 154(b) by 341 days.

(21) Appl. No.: 16/087,979

(22) PCT Filed: Mar. 20, 2017

(86) PCT No.: PCT/KR2017/002940
§ 371 (c)(1),
(2) Date: Sep. 24, 2018

(87) PCT Pub. No.: WO2017/164589
PCT Pub. Date: Sep. 28, 2017

(65) Prior Publication Data
US 2019/0107322 A1    Apr. 11, 2019

(30) Foreign Application Priority Data
Mar. 24, 2016 (KR) .......................... 10-2016-0035198

(51) Int. Cl.
F25D 17/06      (2006.01)
F25B 49/02      (2006.01)
F25D 29/00      (2006.01)

(52) U.S. Cl.
CPC ............ *F25D 29/00* (2013.01); *F25B 49/022* (2013.01); *F25D 17/062* (2013.01); *F25B 2600/0251* (2013.01); *F25B 2600/112* (2013.01); *F25D 2600/04* (2013.01); *F25D 2700/12* (2013.01)

(58) Field of Classification Search
CPC ...... F25D 29/00; F25D 17/062; F25B 49/022; F25B 2600/0251; F25B 2600/112
See application file for complete search history.

(56) References Cited

U.S. PATENT DOCUMENTS 7,007,490 B2 * 3/2006 Jeong .................... F25D 11/022
                                                   62/179
2005/0217287 A1   10/2005 Jeong et al.
2006/0144063 A1    7/2006 Oh

FOREIGN PATENT DOCUMENTS

| EP | 3040656 | | 7/2016 |
| GB | 2390419 | | 1/2004 |
| JP | 09250858 | A * | 9/1997 |
| KR | 10-1997-0075762 | | 12/1997 |
| KR | 10-1999-0000890 | | 1/1999 |
| KR | 10-1999-0046194 | | 7/1999 |

(Continued)

OTHER PUBLICATIONS

Supplementary European Search Report in European Application No. 17770559.7, dated Oct. 4, 2019, 11 pages.

*Primary Examiner* — Ana M Vazquez
(74) *Attorney, Agent, or Firm* — Fish & Richardson P.C.

(57) ABSTRACT

A control method for controlling a refrigerator includes a first step for driving a compressor for compressing a refrigerant and a fan for moving air, a second step for driving the compressor and stopping the fan, a third step for stopping the compressor and driving the fan, and a fourth step for stopping the compressor and the fan.

20 Claims, 6 Drawing Sheets

(56) References Cited

FOREIGN PATENT DOCUMENTS

| | | |
|---|---|---|
| KR | 10-2001-0081574 | 8/2001 |
| KR | 10-0382503 | 5/2003 |
| KR | 10-2011-0097014 | 8/2011 |
| WO | WO1996/015413 | 5/1996 |

* cited by examiner

REFRIGERATOR AND CONTROL METHOD THEREFOR

CROSS-REFERENCE TO RELATED APPLICATIONS

This application is a National Stage application under 35 U.S.C. § 371 of International Application No. PCT/KR2017/002940, filed on Mar. 20, 2017, which claims the benefit of Korean Application No. 10-2016-0035198, filed on Mar. 24, 2016. The disclosures of the prior applications are incorporated by reference in their entirety.

TECHNICAL FIELD

The present invention relates to a refrigerator and a control method therefor, and more particularly, to a refrigerator, which may finely control a temperature of a storage compartment, and a control method therefor.

BACKGROUND ART

In general, a refrigerator includes a machine compartment below a main body. It is general that the machine compartment is provided below the refrigerator considering center of gravity of the refrigerator, assembly efficiency, and vibration attenuation.

A cooling cycle device is provided in the machine compartment of the refrigerator, and maintains the inside of the refrigerator at a frozen/refrigerating state by using a property of absorbing external heat while changing a liquid refrigerant of a low pressure to a gaseous refrigerant, thereby keeping food in a fresh state.

The cooling cycle device of the refrigerator includes a compressor for changing a gaseous refrigerant of low temperature and low pressure to a gaseous refrigerant of high temperature and high pressure, a condenser for changing the gaseous refrigerant of high temperature and high pressure changed by the compressor to a liquid refrigerant of high temperature and high pressure, and an evaporator for absorbing external heat while changing the liquid refrigerant of low temperature and high pressure changed by the condenser to a gaseous refrigerant.

The storage compartment includes a refrigerating compartment maintained at a temperature above zero and a freezing compartment maintained at a temperature below zero, wherein it is required to uniformly maintain the temperature of storage compartment. If the temperature is not maintained uniformly, the temperature may be changed depending on a status of food, whereby a problem occurs in that the duration for keeping food in each storage compartment may be reduced.

Particularly, maintaining a temperature of a refrigerating compartment in the refrigerator is not only a basic function of the refrigerator but also a factor that affects quality of food. If temporal temperature change of the refrigerator is large, since freshness of food fails to be maintained for a long time, it is required to maintain a fixed temperature to keep food for a long time.

DISCLOSURE

Technical Problem

An object of the present invention is to provide a refrigerator, which may uniformly maintain a temperature of a storage compartment, and a control method therefor.

Another object of the present invention is to provide a refrigerator, which may efficiently cool a storage compartment, and a control method therefor.

Technical Solution

To achieve the objects, the present invention provides a control method for a refrigerator comprising: a first step of driving a compressor for compressing a refrigerant and a fan for moving the air; a second step of driving the compressor and stopping the fan; a third step of stopping the compressor and driving the fan; and a fourth step of stopping the compressor and the fan, wherein a temperature of a storage compartment descends in the first step, the temperature of the storage compartment ascends in the second step, the temperature of the storage compartment descends in the third step, and the temperature of the storage compartment ascends in the fourth step.

At this time, the first step to the fourth step are performed in due order, and a temperature change range of the first step includes temperature change ranges of the second step, the third step and the third step, whereby a temperature change range of the first to fourth steps may be reduced.

The first step may start when the temperature of the storage compartment reaches a temperature obtained by adding a first setup difference value to a setup temperature.

The first step may end when the temperature of the storage compartment reaches a temperature obtained by subtracting a first setup difference value from a setup temperature.

The second step may end when the temperature of the storage compartment reaches a temperature obtained by adding a second setup difference value to a setup temperature.

The second setup difference value may be increased if an external temperature of the refrigerator is increased.

The first step may start when the temperature of the storage compartment reaches a temperature obtained by adding the first setup difference value to the setup temperature, and the second setup difference value may be smaller than the first setup difference value.

The second step may be performed and end for a first setup time.

The first setup time may be increased if an external temperature of the refrigerator is increased.

The third step may end when a temperature of an evaporator reaches a specific temperature.

The temperature of the evaporator may be measured in a pipe through, which the refrigerant enters the evaporator, or at one side of the evaporator.

The third step may be performed and ends for a second setup time.

The second setup time may be increased when an external temperature of the refrigerator is increased.

The third step may be performed until the temperature of the evaporator does not reach a temperature above 0.

The third step may end when the temperature of the storage compartment reaches a temperature obtained by subtracting a first setup difference value to a setup temperature.

The fourth step may end when the temperature of the storage compartment reaches a temperature obtained by adding a first setup difference value to a setup temperature.

An end condition of the fourth step may be equal to a start condition of the first step.

The temperature change range of the first step may be equal to a temperature change range of the fourth step, and a temperature of the refrigerator when the second step ends may be lower than a temperature of the refrigerator when the first step starts.

Also, the present invention provides a refrigerator comprising: a cabinet; a storage compartment provided in the cabinet; a compressor for compressing a refrigerant; a fan for supplying the air to the storage compartment; and a controller for controlling the compressor and the fan, wherein the controller performs a first step of driving the compressor and the fan, a second step of driving the compressor and stopping the fan, a third step of stopping the compressor and driving the fan, and a fourth step of stopping the compressor and the fan, and wherein a temperature change range of the first step includes temperature change ranges of the second step, the third step and the third step.

The storage compartment may have a temperature above zero as a setup temperature.

Advantageous Effects

According to the present invention, since a temperature of a storage compartment, particularly a refrigerating compartment may be maintained uniformly, the duration for keeping food may be increased.

Also, according to the present invention, since driving and driving stop of a compressor are not required repeatedly to cool the storage compartment, energy efficiency for driving the refrigerator may be improved.

Also, according to the present invention, since driving and driving stop of a compressor may be increased, noise caused by frequent driving and driving stop may be reduced.

BEST MODE FOR CARRYING OUT THE INVENTION

Generally, a refrigerator is an appliance that keeps food without decomposition for a long time by maintaining a food storage space at a temperature area of a low temperature, where it is difficult to survive and proliferate microbes, by forming the food storage space that can block heat which is externally permeated, by means of a cabinet filled with an insulator therein and a door, and providing a cooling device that includes an evaporator for absorbing heat inside the foods storage space and a radiator for discharging out heat collected outside the food storage space.

The refrigerator is formed by being partitioned into a refrigerating compartment for storing food in a temperature area above zero and a freezing compartment for storing food in a temperature area below zero, and is categorized into a top freezer type refrigerator in which a top freezing compartment and a bottom refrigerating compartment are arranged, a bottom freezer type refrigerator in which a bottom freezing compartment and a top refrigerating compartment are arranged, and a side by side refrigerator in which a left freezing compartment and a right refrigerating compartment are arranged, depending on arrangement of the refrigerating compartment and the freezing compartment.

Also, a plurality of racks and drawers are provided in the food storage space to allow a user to conveniently put or draw out food stored in the food storage space.

Hereinafter, the preferred embodiment of the present invention, which can achieve the above object in detail, will be described with reference to the accompanying drawings.

For clarification and convenience of description, size and shape of each element shown in the drawings may be enlarged or downsized. Also, the terms defined particularly considering elements and operation of the present invention may be modified depending on intention of a user or person skilled in the art or practices. These terms used herein should be defined not simply by the actual terms used but by the meaning lying within and the description disclosed herein.

Figure 1:
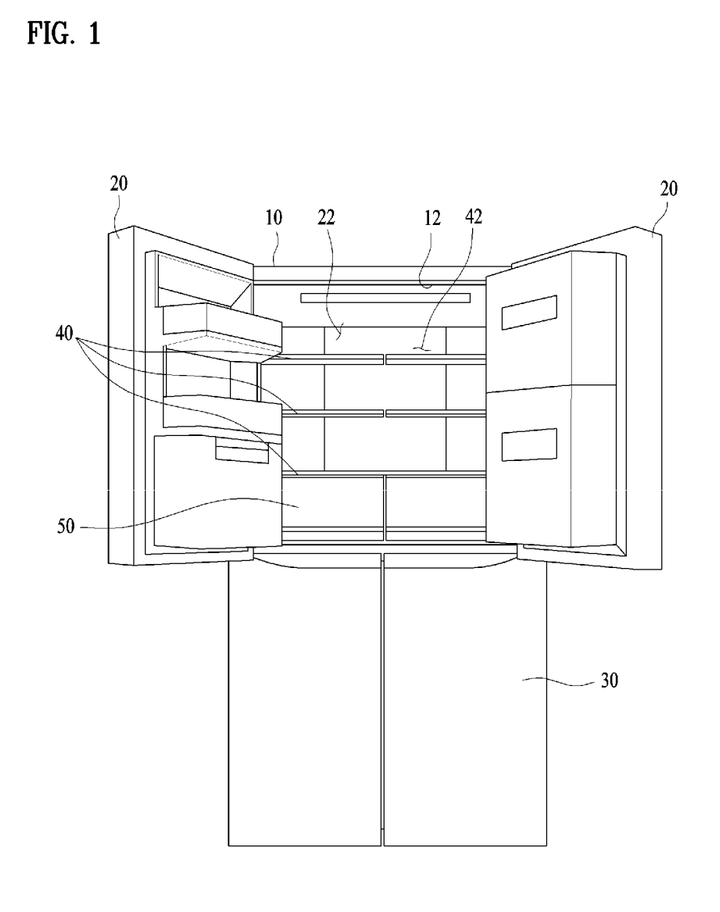
FIG. 1 is a front view illustrating a door of a refrigerator according to the embodiment of the present invention is opened.

FIG. 1 is a front view illustrating a door of a refrigerator according to the embodiment of the present invention is opened.

The refrigerator according to the embodiment is equally applicable to a top mount type refrigerator in which a freezing compartment and a refrigerating compartment, which correspond to storage compartments where food is stored, are partitioned up and down and thus the freezing compartment is arranged above the refrigerating compartment, and a side by side type refrigerator in which a freezing compartment and a refrigerating compartment are partitioned at left and right sides.

However, in this embodiment, for convenience, description will be given based on a bottom freezer type refrigerator in which a freezing compartment and a refrigerating compartment are partitioned up and down and the freezing compartment is arranged below the refrigerating compart.

A cabinet of the refrigerator includes an outer case 10 which forms an entire external appearance when viewed by a user from the outside, and an inner case 12 which forms a storage compartment 22 in which food is stored. A predetermined space is formed between the outer case 10 and the inner case 12, whereby a passage for circulating the cool air may be formed. Meanwhile, an insulator may be filled between the outer case 10 and the inner case 12, whereby the inside of the storage compartment 22 may be maintained at a relatively low temperature as compared with the outside of the storage compartment 22.

Also, a refrigerant cycle device for generating the cool air by circulating a refrigerant is provided in a machine compartment (not shown) formed in the space between the outer case 10 and the inner case 12. The refrigerant cycle device may maintain freshness of food to be stored, by maintaining the inside of the refrigerator at a low temperature. The refrigerant cycle device includes a compressor for compressing a refrigerant, and an evaporator (not shown) for enabling heat exchange with the outside by phase-changing a liquid refrigerant to a gaseous refrigerant.

The refrigerator is provided with doors 20 and 30 for opening or closing the storage compartment. At this time, each of the doors may include a freezing compartment door 30 and a refrigerating compartment door 20, and each door is provided in the cabinet of the refrigerator such that its end is rotated by a hinge. The freezing compartment door 30 and the refrigerating compartment door 20 may be provided in a plural number. That is, as shown in FIG. 1, the refrigerating compartment door 20 and the freezing compartment door 30 may be provided to be opened toward the front based on both corners of the refrigerator.

A foaming agent may be filled between the outer case 10 and the inner case 12 to insulate a portion between the outside and the storage compartment 22.

The storage compartment 22 constitutes a space insulated from the outside by the inner case 12 and the door 20. The storage compartment 22 may be isolated from the outside to form an insulated space if the door 20 seals the storage compartment 22. In other words, the storage compartment 22 may be a space isolated from the outside through an insulation wall formed by the door 20 and an insulation wall formed by the cases 10 and 12.

The cool air supplied from the machine compartment is able to move everywhere in the storage compartment 22, whereby food kept in the storage compartment 22 may be maintained at a low temperature state.

The storage compartment 22 may include a plurality of racks 40 on which food is put. Food may be put on the plurality of racks 40. The racks 40 may partition the inside of the storage compartment in a horizontal direction.

A drawer 50 which can be put in or drawn out is provided in the storage compartment 22. Food is received and stored in the drawer 50. The drawer 50 may be provided such that two drawers may respectively be arranged at left and right sides inside the storage compartment 22. A user may open of the left door of the storage compartment 22 to approach the drawer arranged at the left side. On the other hand, the user may open the right door of the storage compartment 22 to approach the drawer arranged at the right side.

The storage compartment 22 is partitioned into a space above the racks 40 and a space formed by the drawer 50, whereby a plurality of spaces where food is stored may be partitioned.

Although the cool air supplied to one storage compartment does not move to another storage compartment freely, the cool air supplied to one storage compartment may freely move to each space partitioned in one storage compartment. That is, the cool air arranged above the racks 40 is able to move to the space formed by the drawer 50.

Figure 2:
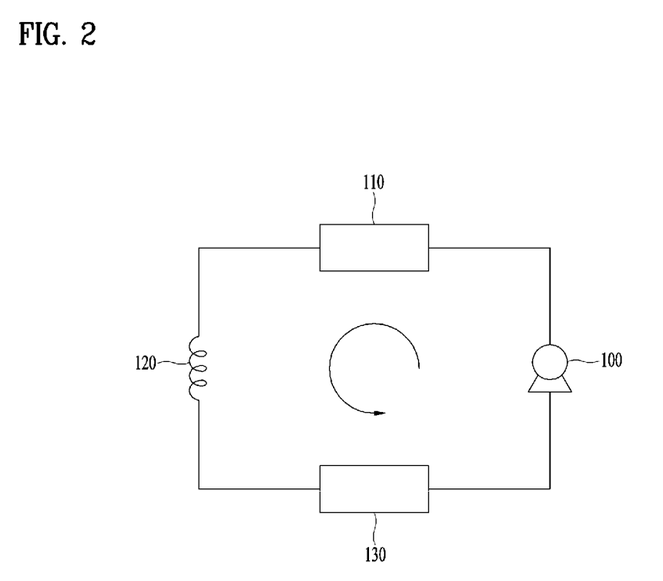
FIG. 2 is a main schematic view according to one embodiment of the present invention.

FIG. 2 is a main schematic view according to one embodiment of the present invention.

In FIG. 2, a compressor 100, a condenser 110, an expansion valve 120 and an evaporator 130 are provided. A refrigerant is compressed by the compressor 100, and the compressed refrigerant is cooled by heat exchange in the condenser 110. The refrigerant is vaporized in the expansion valve 120, and is heat-exchanged with the air in the evaporator 130. At this time, if the air cooled by the evaporator 130 is supplied to the storage compartment 22, a temperature of the storage compartment 22 may be lowered.

Figure 3:
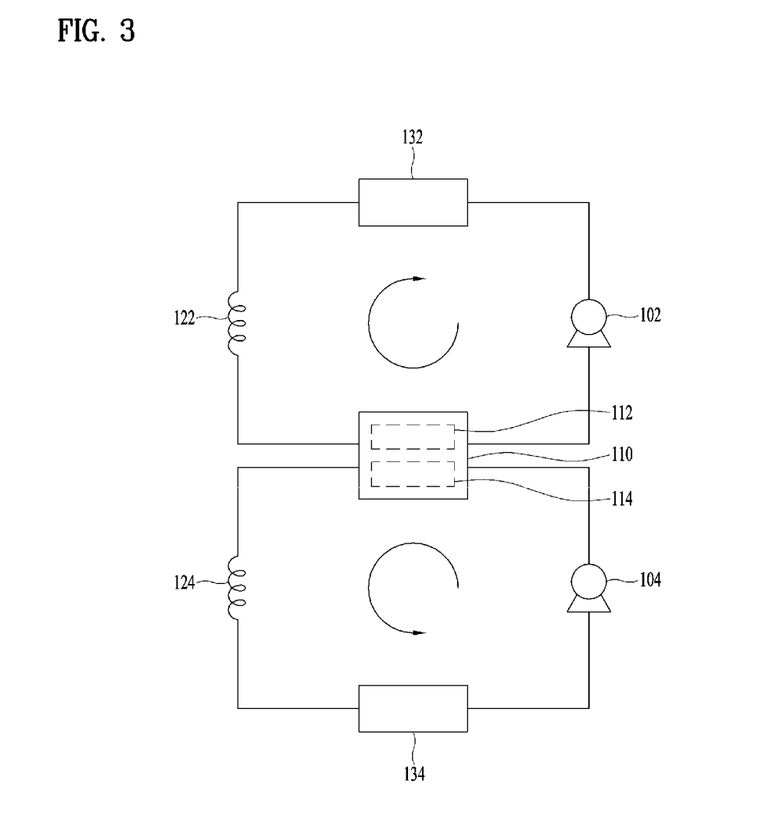
FIG. 3 is a main schematic view according to another embodiment of the present invention.

FIG. 3 is a main schematic view according to another embodiment of the present invention.

Referring to FIG. 3, two compressors 102 and 104, a condenser 110, two expansion valves 122 and 124 and two evaporators 132 and 134 are provided.

Any one of the two compressors 102 and 104, any one of the two expansion valves 122 and 124, and any one of the two evaporators 132 and 134 are elements intended to supply the cool air to the refrigerating compartment, and the other one of the two compressors 102 and 104, the other one of the two expansion valves 122 and 124, and the other one of the two evaporators 132 and 134 are elements intended to supply the cool air to the refrigerating compartment. That is, according to FIG. 3, the elements for supplying the cool air to the refrigerating compartment may be identified from those for supplying the cool air to the freezing compartment.

At this time, the condenser 110 constitutes one heat exchanger, and may be categorized into a condenser 112 through which the refrigerant compressed from any one of the compressors 102 and 104 passes, and a condenser 114 through which the refrigerant compressed from the other one of the compressors 102 and 104. At this time, an individual path through which the refrigerant compressed by each compressor passes is formed inside one condenser 110, whereby two kinds of refrigerants are not mixed with each other in the condenser 112.

A refrigerant is compressed by the compressor 102, and the compressed refrigerant is cooled by heat exchange in the condenser 112. The refrigerant is vaporized in the expansion valve 122, and is heat-exchanged with the air in the evaporator 132. At this time, if the air cooled by the evaporator 132 is supplied to the storage compartment 22, particularly the refrigerating compartment, a temperature of the refrigerating compartment may be lowered.

A refrigerant is compressed by the compressor 104, and the compressed refrigerant is cooled by heat exchange in the condenser 114. The refrigerant is vaporized in the expansion valve 124, and is heat-exchanged with the air in the evaporator 134. At this time, if the air cooled by the evaporator 134 is supplied to the storage compartment 22, particularly the freezing compartment, a temperature of the freezing compartment may be lowered.

As the condenser 110 is shared by the two compressors 102 and 104, a space, such as a machine compartment, for providing an element for supplying the cool air to the refrigerating compartment and the freezing compartment of the refrigerator may be saved.

Figure 4:
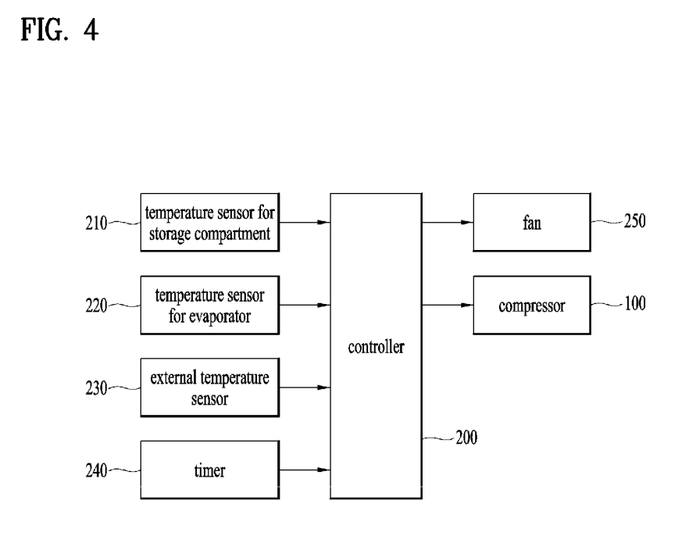
FIG. 4 is a view briefly illustrating a configuration of the present invention.

FIG. 4 is a view briefly illustrating a configuration of the present invention.

Referring to FIG. 4, in the present invention, a temperature sensor 210 for a storage compartment, which may sense a temperature of a portion where food is stored inside the storage compartment 22, that is, the freezing compartment or the refrigerating compartment, is provided. The temperature sensor 210 is provided in a rack or door of the storage compartment 22, whereby the temperature of the storage compartment 22 may be measured. Information on the temperature measured by the temperature sensor 210 for the storage compartment may be forwarded to a controller 200.

A temperature sensor 220 for an evaporator may measure a temperature of the evaporator and then forward information on the temperature to the controller 200.

The temperature sensor 220 for the evaporator may be provided at one side outside the evaporator to measure the temperature of the evaporator.

The temperature sensor 220 for the evaporator may be provided at an inlet of a pipe through which a refrigerant enters the evaporator or an outlet of a pipe through which the refrigerant from the evaporator is discharged, whereby the temperature of the evaporator may be measured.

The temperature sensor 220 for the evaporator may acquire information as to whether ice formed on the evaporator has been sufficiently removed by measuring the temperature of the evaporator. At this time, the refrigerator may further include a heater for heating the evaporator to increase the temperature of the evaporator and allowing the ice to be melted and then detached from the evaporator.

Also, an external temperature sensor 230 for measuring an external temperature of the refrigerator may be provided. The external temperature sensor 230 may measure the external temperature of the refrigerator and forward the measured external temperature to the controller 200. At this time, the external temperature of the refrigerator may mean the temperature of a room or kitchen in which the refrigerator is built. Also, the external temperature of the refrigerator may mean an outer temperature of the storage compartment, that is, a temperature of another space spaced apart from the storage compartment constituting a sealed space where food is stored.

Also, a timer 240 for measuring lapse of time may further be provided. The time measured by the timer 240 may be forwarded to the controller 200. The timer 240 may measure the lapse of time while measuring the time from the time when a specific process starts.

In accordance with the information forwarded from the controller 200, the controller 200 may drive a fan 250 for supplying the air to the storage compartment 22. If the fan 250 is driven, the evaporator is subjected to heat exchange with the air, whereby the air cooled by the evaporator may be supplied to the storage compartment 22. Since the evaporator is communicated with the storage compartment 22 by a through hole, if heat exchange is performed in the evaporator in a state that the fan 250 is not driven, the air in the periphery of the evaporator may stay in the space where the evaporator is installed, at the cooled state.

The controller 200 may drive the compressor 100 or stop driving of the compressor 100 in accordance with the acquired information. If the compressor is driven, the refrigerant is compressed and passes through the condenser 110 and the expansion valve 120. Then, the refrigerant may move to the evaporator 130. Therefore, if the compressor 100 is driven, the evaporator 130 is cooled and heat-exchanged with the peripheral air, whereby the air in the periphery of the evaporator 130 may be cooled. The aforementioned description and the following description are based on FIG. 2 for convenience of description, but may equally be applied to a plurality of compressors of FIG. 3.

Figure 5:
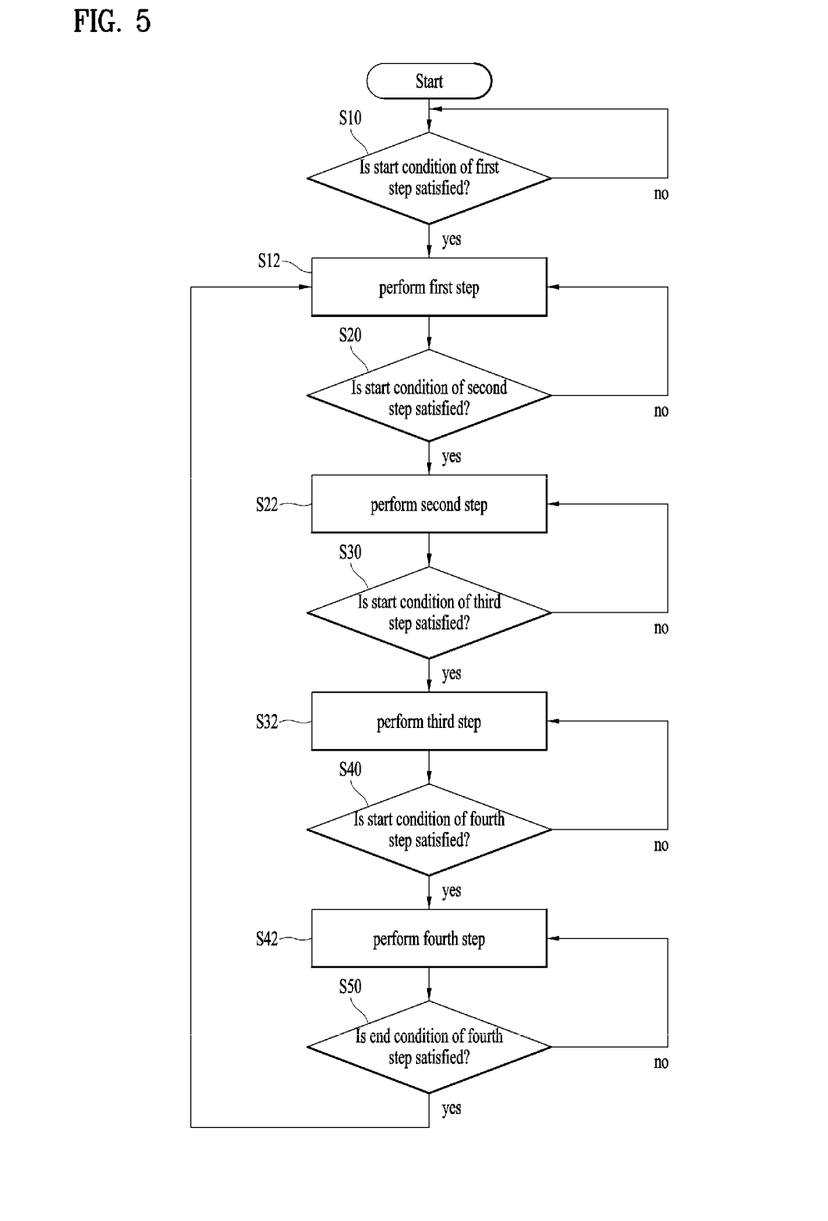
FIG. 5 is a view illustrating a control flow of the present invention.
Figure 6:
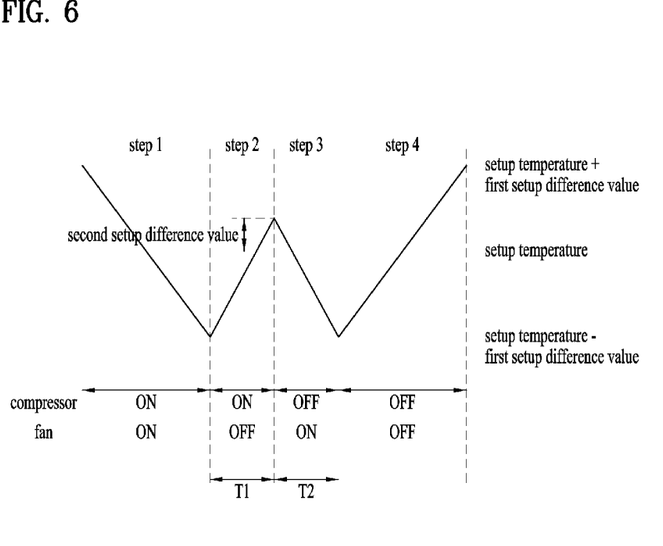
FIG. 6 is a view illustrating a temperature change of a storage compartment in the present invention.

FIG. 5 is a view illustrating a control flow of the present invention, and FIG. 6 is a view illustrating a temperature change of a storage compartment in the present invention.

Referring to FIGS. 5 and 6, a control flow for maintaining a specific temperature range of the storage compartment 22 in the present invention will be described.

In the present invention, in order that the temperature of the storage compartment is maintained within a predetermined temperature range, a total of four steps are performed in due order.

The present invention includes a first step of driving the compressor 100 for compressing a refrigerant and the fan 250 for moving the air, a second step of driving the compressor 100 and stopping the fan 250, a third step of stopping the compressor 100 and driving the fan 250, and a fourth step of stopping the compressor 100 and the fan 250.

The first step is performed immediately after the fourth step ends.

A temperature change distribution may be provided in such a manner that the temperature of the storage compartment descends in the first step, the temperature of the storage compartment ascends in the second step, the temperature of the storage compartment descends in the third step, and the temperature of the storage compartment ascends in the fourth step.

The first step starts if a start condition of the first step is satisfied (S10). The start condition of the first step means a temperature change width allowed at a setup temperature of the storage compartment 22, that is, a temperature added by a first setup difference value. That is, if the temperature of the storage compartment 22 is increased by the setup temperature and the first setup temperature difference value, the first step is performed (S12).

At this time, the first setup temperature difference value may mean 0.5 degree, approximately.

Since the compressor 100 is driven in the first step, the evaporator is cooled, and the air cooled through the evaporator moves to the storage compartment by means of the fan 250, whereby the temperature of the storage compartment 22 may descend. At this time, the temperature of the storage compartment 22 may be changed in a curved line type not a linear line type shown in FIG. 6. However, for convenience of description, the temperature of the storage compartment 22 is briefly expressed in a linear type in FIG. 6.

It is determined whether a start condition of the second step is satisfied while the first step is being performed (S20). At this time, the start condition of the second step is equal to the end condition of the first step. This is because that the second step is performed if the first step ends.

The first step may end when the temperature of the storage compartment 22 reaches a temperature obtained by subtracting the first setup difference value from the setup temperature. That is, the second step starts when the temperature of the storage compartment 22 reaches a temperature obtained by subtracting the first setup difference value from the setup temperature.

Therefore, in the first step, the storage compartment 22 may be changed within the range of the temperature obtained by adding the first setup difference value to the setup temperature and the temperature obtained by subtracting the first setup difference value from the setup temperature. At this time, if the first setup difference value is 0.5 degree, approximately, the temperature change may be performed in the first step within the range of 1 degree based on the setup temperature of the storage compartment 22.

In the second step, driving of the compressor 100 is maintained, whereas driving of the fan 250 may be stopped (S22). Since the compressor 100 is driven, the evaporator cools its peripheral air at a low temperature. However, since the fan 250 is not driven, most of the air cooled by the evaporator fails to move to the storage compartment 22 and is located near the evaporator.

Therefore, the temperature of the storage compartment 22 is more increased than the temperature at the time when the second step starts.

It is determined whether a start condition of the third step is satisfied while the second step is being performed (S30). At this time, the start condition of the third step is equal to the end condition of the second step. This is because that the third step is performed if the second step ends.

The second step may end when the temperature of the storage compartment 22 reaches a temperature obtained by adding a second setup difference value to the setup temperature. At this time, the second setup difference value may be increased if the external temperature of the refrigerator is increased. Increase of the second setup difference value may mean that the time when the second step is performed is increased.

TABLE 1

| External temperature (° C.) | T < 18 | 18 < T < 22 | 22 < T < 34 | 34 < T |
|---|---|---|---|---|
| Second setup difference value | | Decrease <-> increase | | |

If an external temperature T is increased, the cool air for cooling the storage compartment 22 is more required. That is, if the external temperature is high, the compressor 100 should be more driven to cool the storage compartment 22 at the same temperature.

In the second step, even though the compressor 100 is not driven in the third step, the air enough to cool the storage compartment 22 should be acquired. Therefore, if the external temperature is increased, to more accumulate the cool air in the second step, the time when the second step is performed should be longer. To this end, the second setup difference value from the end condition of the second step, which includes the setup temperature and the second setup difference value, may be changed greatly, whereby the second step may end after standby until the temperature of the storage compartment 22 is higher increased.

Also, a user tends to be relatively susceptible to noise if the compressor 100 is repeatedly driven and stopped at a frequent cycle. Also, if the compressor 100 repeats frequent driving and stop, since energy efficiency may be reduced, it is preferable that the compressor 100 is stopped after making sure of the sufficient air since the compressor 100 is driven for a long time.

Meanwhile, the second setup difference value may be changed with a total of four periods as shown in Table 1 above. For example, the second setup difference value may be selected with a total of four change values in accordance with the temperature measured by the external temperature sensor 230.

Meanwhile, it is preferable that the second setup difference value is smaller than the first setup difference value. That is, it is preferable that the temperature of the storage compartment 22 at the end timing of the second step is lower than the temperature of the storage compartment 22 at the start timing of the first step. Since a temperature change range in the first step includes a temperature change range of the second step, it is preferable that the temperature change range of the storage compartment 22 becomes small. Therefore, the storage compartment 22 is changed within a narrow range based on the setup temperature, whereby the temperature change width of the storage compartment 22 may be reduced.

As another end condition of the second step, it may be determined whether the second step has been performed for the first setup time T1 (S30).

TABLE 2

| External temperature (° C.) | T < 18 | 18 < T < 22 | 22 < T < 34 | 34 < T |
|---|---|---|---|---|
| First setup difference value | | Decrease <-> increase | | |

If the external temperature T is increased, the cool air for cooling the storage compartment 22 is more required. That is, if the external temperature is high, the compressor 100 should be more driven to cool the storage compartment 22 at the same temperature.

In the second step, even though the compressor 100 is not driven in the third step, the air enough to cool the storage compartment 22 should be acquired. Therefore, if the external temperature is increased, to more accumulate the cool air in the second step, the time when the second step is performed, that is, the first setup time T1 should be longer.

Meanwhile, the first setup difference value may be changed with a total of four periods as shown in Table 2 above. For example, the first setup difference value may be selected with a total of four change values in accordance with the temperature measured by the external temperature sensor 230.

The first setup time T1 may be measured by the timer 240. The timer 240 starts to measure lapse of time if the second step starts, that is, if the state that the compressor 100 is driven and the fan 250 is stopped starts, and may forward information as to whether the first setup time T1 has passed to the controller 200.

In the third step, driving of the compressor 100 is stopped, and the fan 250 is driven (S32). Since the compressor 100 is not driven, the cool air is not generated in the evaporator, whereby it is difficult to continuously cool the air in the periphery of the evaporator. Meanwhile, since the air in the periphery of the evaporator is cooled in the second step, if the fan 250 is driven, the cooled air moves to the storage compartment 22, whereby the storage compartment 22 may be cooled. Therefore, as shown in FIG. 6, the internal temperature of the storage compartment 22 may descend.

Since the compressor 100 is not driven in the third step, noise caused by the compressor 100 does not occur (S32). Typically, since noise caused by the compressor 100 is greater than noise caused by the fan 250, noise in the third step may be maintained at a level smaller than that of noise in the second step.

It is determined whether a start condition of the fourth step is satisfied while the third step is being performed (S40). At this time, the start condition of the fourth step is equal to the end condition of the third step. This is because that the fourth step is performed if the third step ends.

The third step may end when the temperature of the evaporator reaches a specific temperature. The temperature of the evaporator may be measured in the temperature sensor 220 for the evaporator. The specific temperature may mean a temperature that may not affect reliability of dew or freezing inside the storage compartment 220 as sublimation of ice formed in the evaporator is generated by driving of the fan 250. Specifically, the specific temperature may mean a temperature above 0° C.

At this time, the temperature sensor 220 for the evaporator may measure a temperature of a pipe through which the refrigerant enters the evaporator, or a temperature at one side of the evaporator.

Also, the third step may be performed for the second setup time T2 and then end.

TABLE 3

| External temperature (° C.) | T < 18 | 18 < T < 22 | 22 < T < 34 | 34 < T |
|---|---|---|---|---|
| Second setup difference value | | Decrease <-> increase | | |

If the external temperature T is increased, the cool air for cooling the storage compartment 22 is more required. That is, if the external temperature is high, the compressor 100 should be more driven to cool the storage compartment 22 at the same temperature. If the external temperature in the second step is measured to be high, since the first setup time is long, the compressor 100 is driven for a longer time, whereby the cool air is more accumulated. Therefore, in the third step, to sufficiently move the cool air accumulated in the second step to the storage compartment 22, the fan 250 may be driven for a longer time. That is, since the cool air is more included, the fan 250 is more driven such that the cool air in the periphery of the evaporator sufficiently moves to the storage compartment 22, whereby the storage compartment 22 may be cooled.

Meanwhile, the second setup time may be changed with a total of four periods as shown in Table 3 above. For example, the second setup time may be selected with a total of four change values in accordance with the temperature measured by the external temperature sensor 230.

The start condition of the fourth step may start when the temperature of the storage compartment 22 reaches a value obtained by subtracting the first setup difference value from the setup temperature, in addition to the aforementioned two conditions. Since the start condition of the fourth step is equal to the case that the second step starts, its detailed description will be omitted.

If the fourth step is performed, since the fan 250 and the compressor 100 are not driven, noise is not generated (S42). On the other hand, since the cool air is not supplied to the storage compartment 22, the temperature of the storage compartment 22 may be increased.

It is determined whether an end condition of the fourth step is satisfied while the fourth step is being performed (S50). At this time, the end condition of the fourth step is equal to the start condition of the first step. This is because that the first step is performed immediately after the fourth step ends.

The fourth step may end when the temperature of the storage compartment 22 reaches a temperature obtained by adding the first setup difference value to the setup temperature. Therefore, a change range of the internal temperature of the storage compartment 22 may be included in the temperature change range of the first step.

Meanwhile, the temperature change range of the first step may be equal to the temperature change range of the fourth step.

In the present invention, since the compressor 100 is driven in the first step and the second step and not driven in the third step and the fourth step, a cycle for driving and stop of the compressor 100 may be increased. Therefore, noise caused by driving of the compressor 100 may be reduced.

Also, since the driving cycle of the compressor 100 is increased, energy efficiency consumed to drive the compressor 100 may be improved. This is because that power consumed to drive the compressor 100 may be increased greatly if the compressor 100 is frequently turned on or off.

Also, since the temperature change range of the first step includes the temperature change range of the third step and the fourth step, the temperature of the storage compartment 22 may be changed within the temperature change range of the first step. Of course, the temperature of the storage compartment 22 may be changed within the temperature change range of the fourth step. Therefore, a change range width of the temperature of the storage compartment 22 may be reduced, whereby the temperature of food stored in the storage compartment 22 may be maintained within a certain range, and the duration for storing food may be increased.

Particularly, the storage compartment 22 may be the refrigerating compartment. Since the refrigerating compartment has a temperature above zero as a setup temperature, food is kept in the refrigerating compartment at a temperature higher than that of the freezing compartment. Therefore, food kept in the refrigerating compartment is susceptible to the temperature change of the storage compartment as compared with the food kept in the freezing compartment. Since the control flow described in the present invention is applied to the refrigerating compartment, the temperature change width of the refrigerating compartment may be reduced.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A control method for a refrigerator comprising:
   a first step of driving a compressor for compressing a refrigerant and a fan for moving air;
   a second step of driving the compressor and stopping the fan;
   a third step of stopping the compressor and driving the fan; and
   a fourth step of stopping the compressor and the fan,
   wherein a temperature of a storage compartment descends in the first step, the temperature of the storage compartment ascends in the second step, the temperature of the storage compartment descends in the third step, and the temperature of the storage compartment ascends in the fourth step, the first step to the fourth step are performed in due order, and a temperature change range of the first step includes temperature change ranges of the second step, the third step, and the fourth step, and
   wherein the temperature change range of the first step is equal to the temperature change range of the fourth step.

2. The control method of claim 1, wherein the first step starts when the temperature of the storage compartment reaches a temperature obtained by adding a first setup difference value to a setup temperature.

3. The control method of claim 1, wherein the first step ends when the temperature of the storage compartment reaches a temperature obtained by subtracting a first setup difference value from a setup temperature.

4. The control method of claim 1, wherein the second step ends when the temperature of the storage compartment reaches a temperature obtained by adding a second setup difference value to a setup temperature.

5. The control method of claim 4, wherein the second setup difference value is increased if an external temperature of the refrigerator is increased.

6. The control method of claim 4, wherein the first step starts when the temperature of the storage compartment reaches a temperature obtained by adding a first setup difference value to the setup temperature, and the second setup difference value is smaller than the first setup difference value.

7. The control method of claim 1, wherein the second step is performed and ends for a first setup time.

8. The control method of claim 7, wherein the first setup time is increased if an external temperature of the refrigerator is increased.

9. The control method of claim 1, wherein the third step ends when a temperature of an evaporator reaches a specific temperature.

10. The control method of claim 9, wherein the temperature of the evaporator is measured in a pipe through, which the refrigerant enters the evaporator, or at one side of the evaporator.

11. The control method of claim 1, wherein the third step is performed and ends for a second setup time.

12. The control method of claim 11, wherein the second setup time is increased when an external temperature of the refrigerator is increased.

13. The control method of claim 11, wherein the third step is performed until a temperature of an evaporator does not reach a temperature above 0.

14. The control method of claim 1, wherein the third step ends when the temperature of the storage compartment reaches a temperature obtained by subtracting a first setup difference value to a setup temperature.

15. The control method of claim 1, wherein the fourth step ends when the temperature of the storage compartment reaches a temperature obtained by adding a first setup difference value to a setup temperature.

16. The control method of claim 1, wherein an end condition of the fourth step is equal to a start condition of the first step.

17. The control method of claim 1, wherein a temperature of the refrigerator when the second step ends is lower than a temperature of the refrigerator when the first step starts.

18. A control method for controlling a refrigerator, the method comprising:
   a first step of driving a compressor for compressing a refrigerant and a fan for moving air;
   a second step of driving the compressor and stopping the fan;
   a third step of stopping the compressor and driving the fan; and
   a fourth step of stopping the compressor and the fan,
   wherein a temperature of a storage compartment descends in the first step, the temperature of the storage compartment ascends in the second step, the temperature of the storage compartment descends in the third step, and the temperature of the storage compartment ascends in the fourth step, the first step to the fourth step are performed in due order, and a temperature change range of the first step includes temperature change ranges of the second step, the third step and the fourth step,
   wherein the method further comprises:
      starting the first step based on the temperature of the storage compartment reaching a temperature that is obtained by adding a first setup difference value to a setup temperature, and
      ending the first step based on the temperature of the storage compartment reaching a temperature obtained by subtracting the first setup difference value from the setup temperature.

19. The control method of claim 18, further comprising ending the second step based on the temperature of the storage compartment reaching a temperature obtained by adding a second setup difference value to the setup temperature.

20. The control method of claim 19, wherein the second setup difference value is increased based on an increase of an external temperature of the refrigerator.

* * * * *